US006969238B2

(12) United States Patent
Groh et al.

(10) Patent No.: US 6,969,238 B2
(45) Date of Patent: Nov. 29, 2005

(54) TRI-PROPERTY ROTOR ASSEMBLY OF A TURBINE ENGINE, AND METHOD FOR ITS PREPARATION

(75) Inventors: Jon Raymond Groh, Loveland, OH (US); Charles William Carrier, West Chester, OH (US)

(73) Assignee: General Electric Company, Schenectady, NY (US)

( * ) Notice: Subject to any disclaimer, the term of this patent is extended or adjusted under 35 U.S.C. 154(b) by 32 days.

(21) Appl. No.: 10/691,009

(22) Filed: Oct. 21, 2003

(65) Prior Publication Data

US 2005/0084381 A1 Apr. 21, 2005

(51) Int. Cl.[7] ........................ F01D 5/30

(52) U.S. Cl. ........................ 416/213 R; 416/241 R; 415/200; 415/216.1

(58) Field of Search ........................ 416/213 R, 241 R; 415/216.1, 200

(56) References Cited

U.S. PATENT DOCUMENTS

| | | | | | |
|---|---|---|---|---|---|
| 3,571,906 | A | * | 3/1971 | Barth et al. | 228/113 |
| 3,582,605 | A | * | 6/1971 | Lamatsch | 219/121.14 |
| 3,763,549 | A | * | 10/1973 | Bonneville et al. | 228/114.5 |
| 3,768,147 | A | * | 10/1973 | Berry et al. | 416/213 R |
| 4,034,182 | A | | 7/1977 | Schlosser et al. | |
| 4,053,261 | A | | 10/1977 | Pennig | |
| 4,096,615 | A | * | 6/1978 | Cross | 416/213 R |
| 4,270,256 | A | * | 6/1981 | Ewing | 416/213 R |
| 4,273,512 | A | | 6/1981 | Weiler | |
| 4,592,120 | A | * | 6/1986 | Egan et al. | 416/213 R |
| 4,784,572 | A | * | 11/1988 | Novotny et al. | 416/213 R |
| H647 | H | | 7/1989 | Johnson et al. | |
| 4,850,802 | A | | 7/1989 | Pankratz et al. | |
| 4,964,564 | A | * | 10/1990 | Neal et al. | 416/241 R |
| 5,161,950 | A | | 11/1992 | Krueger et al. | |
| 5,518,562 | A | | 5/1996 | Searle et al. | |
| 5,746,579 | A | * | 5/1998 | Amos et al. | 416/204 A |
| 6,478,545 | B2 | | 11/2002 | Crall et al. | |

* cited by examiner

*Primary Examiner*—Edward K. Look
*Assistant Examiner*—Igor Kershteyn
(74) *Attorney, Agent, or Firm*—McNees Wallace & Nurick LLC

(57) ABSTRACT

A rotor assembly of an axial flow turbine engine has a bladed ring including a ring, and a plurality of turbine blades affixed to the ring and extending radially outwardly from the ring. There is a solid state weld joint between a central disk hub and the ring of the bladed ring. In one approach, the rotor assembly is prepared by bonding the plurality of turbine blades to the coarse-grain ring so that the turbine blades extend outwardly from the ring, providing the fine-grain central disk hub, and solid-state inertia welding the central disk hub and the ring of the bladed ring at a solid state weld joint.

12 Claims, 3 Drawing Sheets

TRI-PROPERTY ROTOR ASSEMBLY OF A TURBINE ENGINE, AND METHOD FOR ITS PREPARATION

This invention relates to a rotor assembly used in a turbine engine and its preparation, and, more particularly, to a tri-property BLISK.

BACKGROUND OF THE INVENTION

In an aircraft axial-flow gas turbine (jet) engine, air is drawn into the front of the engine, compressed by a shaft-mounted compressor, and mixed with fuel. The mixture is combusted, and the resulting hot combustion gases are passed through a turbine mounted on the same shaft. The flow of gas turns the turbine by contacting an airfoil portion of the turbine blade, which turns the shaft and provides power to the compressor. The hot exhaust gases flow from the back of the engine, driving it and the aircraft forward. There may additionally be a turbofan that drives a bypass flow of air rearwardly to improve the thrust of the engine.

The compressor, the turbine, and the turbofan have a similar construction. They each have a rotor assembly including a rotor disk and a set of blades extending radially outwardly from the rotor disk. The compressor, the turbine, and the turbofan share this basic configuration. However, the materials of construction of the rotor disks and the blades, as well as the shapes and sizes of the rotor disks and the blades, vary in these different sections of the gas turbine engine. The blades may be integral with and metallurgically bonded to the disk, forming a BLISK ("bladed disk"), or they may be mechanically attached to the disk.

The turbine disks and blades are subjected to high loadings during service, and the nature of the performance-limiting consideration varies with radial position. The periphery of the disk is at a higher temperature than the hub of the disk. The performance of the periphery portions of the turbine disks and the turbine blades are limited by creep loading and defect tolerance. The performance of the hub portions of the turbine disk are limited by tensile and cyclic loading. Nickel-base superalloys are the best available material compositions for use in the turbine blades and disks.

The metallurgical grain sizes are also selected to meet the property requirements. Turbine airfoils are often cast using directional solidification to achieve either preferred grain boundary orientations or to eliminate the grain boundaries entirely. Airfoils may also be cast hollow or with integral cooling passages. The forged grains along the disk periphery are preferably relatively coarse to resist creep deformation. The forged grains of the central disk hub are preferably relatively fine for good tensile and fatigue strength. A number of different metallurgical processing techniques are used to produce the different types of microstructures required in the single BLISK or bladed-disk article. Different forging processes, heat treatments, and thermo-mechanical processing are used for the different parts of the disk.

These manufacturing techniques, while operable, are difficult to apply in production practice. The disks are relatively large in size, often several feet across, and it is difficult to achieve a highly controlled microstructure over this large area. The processing must allow the development of the desired precipitation-hardened microstructure, while also achieving the required grain size distribution. The problem is even more acute when the rotor assembly is a BLISK, where the heat treatment of the disk must be compatible with the bonding process of the blade to the disk. The airfoil bonding process is often performed using diffusion-dependent processes which benefit from high temperature exposure that are incompatible with critical metallurgical temperatures which cannot be exceeded if the fine-grain central disk hub is to be realized.

There is a need for an improved approach for preparing a rotor assembly for an axial-flow aircraft gas turbine. The approach must achieve the required microstructures in a production setting. The present invention fulfills this need, and further provides related advantages.

SUMMARY OF THE INVENTION

The present invention provides a method for preparing a rotor assembly of an axial-flow turbine engine, and a rotor assembly. The approach produces a rotor assembly with the desired grain-size distribution and precipitate microstructure to achieve the required mechanical properties. The approach is compatible with the use of integrally bonded blades (i.e., a BLISK), or mechanically affixed blades.

A rotor assembly of an axial flow turbine engine comprises a bladed ring including a ring, and a plurality of turbine blades affixed to the ring and extending radially outwardly from the ring. The rotor assembly further includes a central disk hub, and a solid state weld joint between the central disk hub and the ring of the bladed ring.

The present approach has a great deal of manufacturing flexibility. In the preferred approach, the ring has a first grain size, the central disk hub has a second grain size smaller than the first grain size, and the solid state weld joint has a third grain size smaller than the second grain size. This distribution of grain sizes may be altered, however. The approach is operable where the turbine blades are metallurgically and integrally bonded to the ring, or where the turbine blades are mechanically affixed to the ring but not bonded to the ring, as with a dovetail structure.

The material selection is also flexible. In the usual case, the ring is made of a first material, and the turbine blades are made of a second material. Typically, the ring is made of a first nickel-base superalloy, and the turbine blades are made of a second nickel-base superalloy. In one embodiment the ring and the central disk hub are made of the first material, and the turbine blades are made of the second material. Preferably, the ring and the central disk hub are made of a first nickel-base superalloy, and the turbine blades are made of a second nickel-base superalloy. In this case, the entire disk (i.e., the ring and the central disk hub) is made of the first material, and the blades are made of the second material. More generally, however, the ring may be made of a first material, the turbine blades made of a second material, and the central disk hub made of a third material.

In a presently preferred embodiment, an axial-flow turbine rotor assembly comprises a bladed ring including a ring made of a first nickel-base superalloy, and a plurality of turbine blades bonded to the ring and extending radially outwardly from the ring, wherein the turbine blades are made of a second nickel-base superalloy. A central disk hub is made of the first nickel-base superalloy. There is a solid state weld joint, preferably an inertia weld joint, between the central disk hub and the ring of the bladed ring. Compatible features discussed elsewhere herein are operable with this embodiment.

A method for preparing a rotor assembly of an axial flow turbine engine comprises the step of providing a bladed ring. The step of providing the bladed ring includes the step of bonding a plurality of turbine blades to a ring so that the turbine blades extend outwardly from the ring, creating a bladed ring, sometimes termed a BLING. The method further includes providing a central disk hub, and solid-state inertia welding the central disk hub and the ring of the bladed ring at a solid state weld joint. (Inertia welding is also sometimes termed "friction welding".) The step of bonding the turbine blades to the ring is completed prior to a commencement of the step of solid-state inertia welding. The turbine blades are preferably diffusion bonded to the ring. The ring preferably has a coarser grain structure than the central disk hub. The solid-state inertia welding is preferably performed by rotating at least one of the central disk hub and the bladed ring about a rotational axis with the central disk hub and the bladed ring separated from each other, and moving the central disk hub and the bladed ring into contact in a direction parallel to the rotational axis, wherein the contact occurs at the solid-state weld joint. Compatible features discussed elsewhere herein are operable with this embodiment.

The present approach produces a tri-property rotor assembly wherein the disk has a central disk hub with a hub composition, a hub grain size, and hub properties; a ring with a ring composition, a ring grain size, and ring properties; and blades with a blade composition, a blade grain size (which may be single-grain), and blade properties. In the preferred embodiment, the hub composition and the ring composition are the same, but the hub grain size is smaller than the ring grain size. In the preferred application where the blades are integrally bonded to the ring, as by diffusion bonding, the blades are preferably bonded to the ring before the ring is bonded to the central disk hub, so that the bonding operation may be performed at a higher temperature than the central disk hub may be exposed to in order to retain its small grain size. The inner surface of the ring, with the blades already bonded to the outer surface of the ring, is then bonded to the outer surface of the central disk hub by solid-state inertia welding, which does not significantly coarsen the grain size of the central disk hub. Final precipitation heat treatment of the bonded and welded assembly may be accomplished typically in the 1400° F.–1550° F. range. An optional sub-solvus anneal prior to the precipitation heat treatment may also be used.

The present approach produces a high-quality rotor assembly without the complex differential heat treating apparatus that is required for some other approaches. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
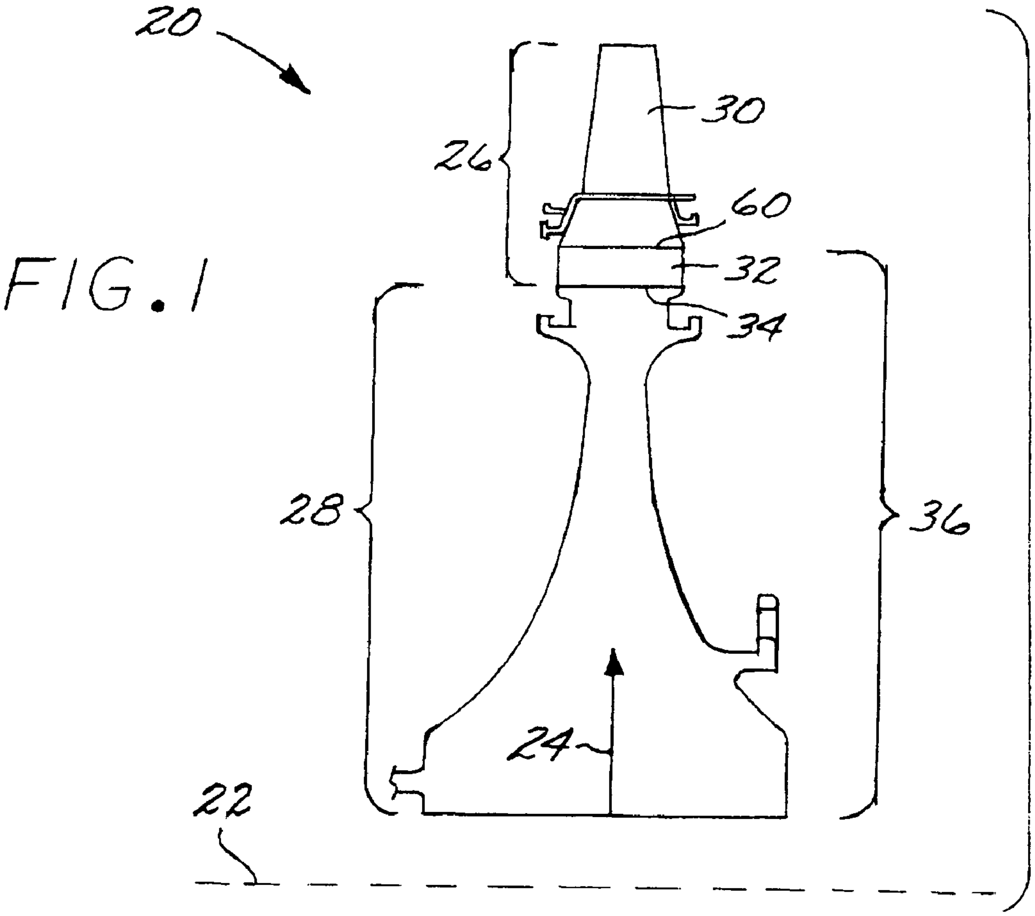
FIG. 1 is a partial sectional view of a rotor assembly.

FIG. 1 depicts, in a partial sectional view, a rotor assembly 20 of an axial flow gas turbine engine. The rotor assembly is preferably a turbine rotor assembly, but it may be a compressor rotor assembly or a bypass-fan rotor assembly. The present approach will be described in relation to the preferred turbine rotor assembly, with the understanding that it may be applied to the other contexts as well. The rotor assembly 20 is axially symmetric about an axis of rotation 22, and a radial direction 24 is defined as perpendicular to the axis of rotation 22.

The rotor assembly 20 includes a bladed ring 26 and a central disk hub 28. The bladed ring 26 has a plurality of turbine blades 30 (one of which is illustrated) affixed to a ring 32 and extending radially outwardly from an outer surface 60 of the ring 32. The turbine blades 30 are preferably bonded (i.e., metallurgically bonded) to the ring 32, so that the rotor assembly 20 is a BLISK ("bladed disk"). The turbine blades 30 may instead be mechanically affixed to the ring 32 using an operable mechanical joint, such as the conventional dovetail joint. As will be discussed in greater detail subsequently, the ring 32 is joined to the central disk hub 28 at a solid-state weld joint 34 to define a disk 36 to which the turbine blades 30 are affixed by bonding (preferably diffusion bonding) prior to inertia welding, or by a mechanical joint.

Figure 2:
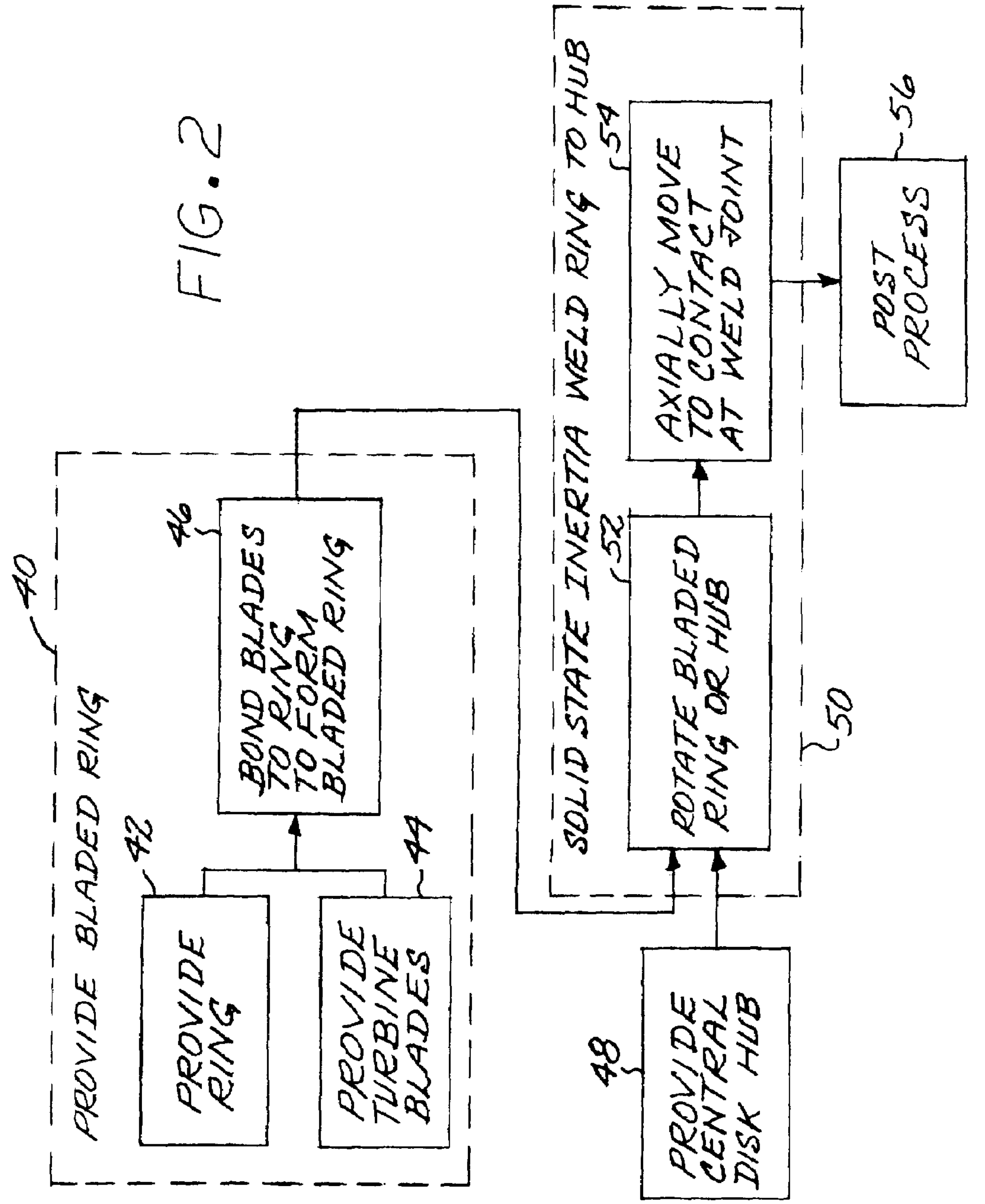
FIG. 2 is a block flow diagram of a method for practicing an embodiment of the invention.
Figure 3:
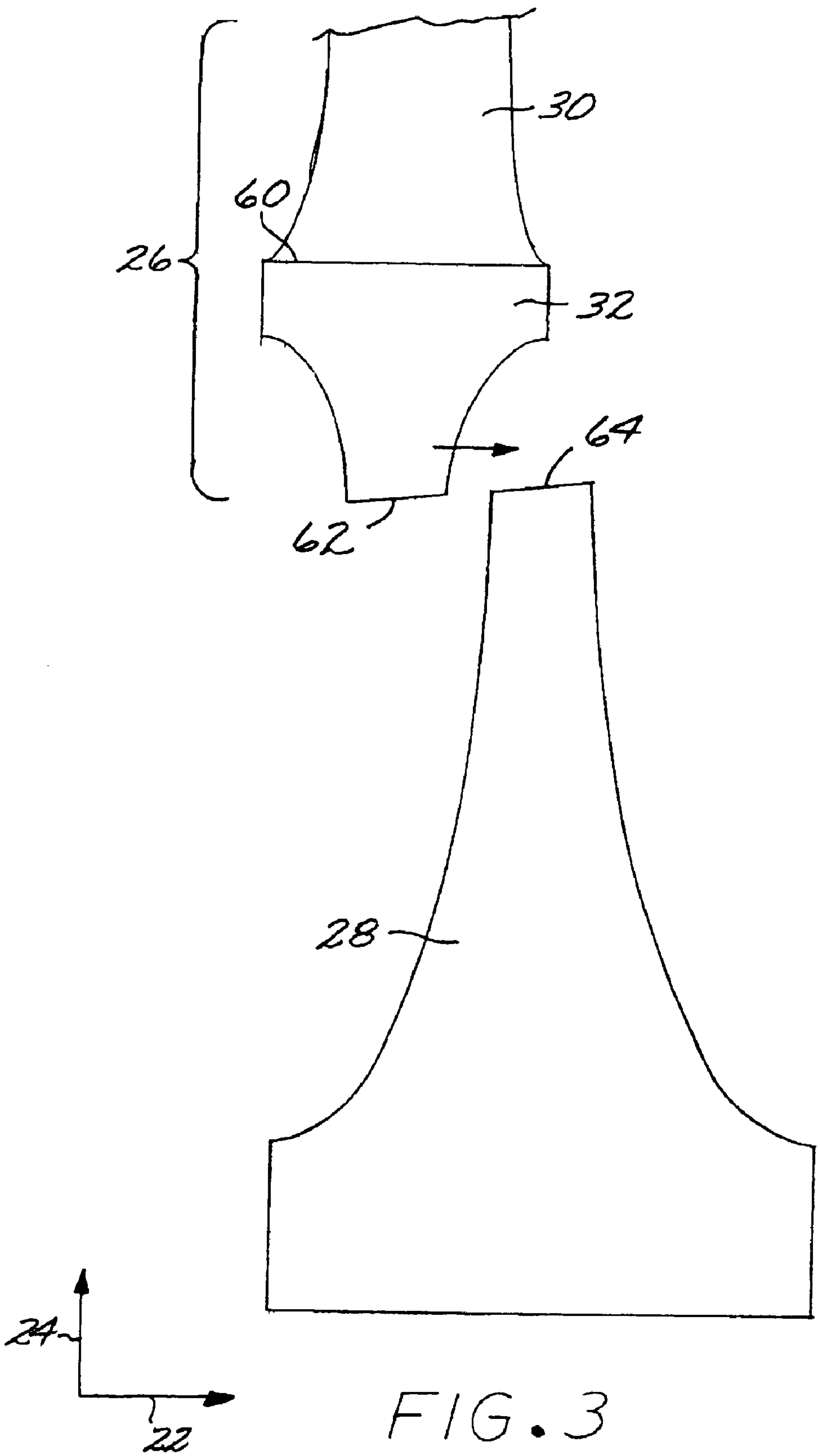
FIG. 3 is a schematic drawing of the mode of joining in the preferred inertia welding approach.

FIG. 2 illustrates a preferred approach for practicing an embodiment of the invention for preparing the rotor assembly 20, and FIG. 3 illustrates the rotor assembly 20 at an intermediate stage of the fabrication process. This embodiment produces an integrally bladed rotor assembly or BLISK, in which the turbine blades 30 are metallurgically bonded to the disk 36. In this method, the bladed ring 26 is provided, step 40. In a preferred approach, the ring 32 is provided as a freestanding, generally annular piece of material, step 42. The ring 32 is typically forged from a nickel-base superalloy or other alloy. The plurality of turbine blades 30 are provided, step 44, as freestanding pieces having the required aerodynamic shape, typically by casting for the case of turbine blades.

The turbine blades 30 are bonded, step 46, to the outer surface 60 of the ring 32, preferably by diffusion bonding, to form the bladed ring 26. In diffusion bonding, the turbine blades 30 and the ring 32 are heated to a diffusion bonding temperature and then forced together in a direction parallel to the radial direction 24. The diffusion bonding temperature is quite high, typically at least about 2100° F. for the efficient diffusion bonding of nickel-base superalloys. At this diffusion bonding temperature, the grain size of the ring 32 typically grows quite large, on the order of 16–90 micrometers. This large grain size is desirable for the ring 32, but it would be undesirable for the central disk hub 28. The present approach, in which the central disk hub 28 is not present during the diffusion bonding cycle, allows the grain size of the central disk hub 28 to be maintained at a smaller, more desirable value, typically 10 micrometers or finer.

The central disk hub 28 is provided, step 48. The central disk hub 28 is preferably provided by thermomechanically processing, preferably forging, a blank to the desired shape. The thermomechanical processing is usually selected to produce a relatively fine grain size (i.e., finer than the grain size of the ring 32) in the central disk hub 28, usually about 10 micrometers or smaller.

The bladed ring 26 is thereafter solid-state inertia welded to the central disk hub 28, step 50. In this approach, step 40 must be completed before step 50 may be started. The solid-state inertia welding 50 is preferably accomplished by rotating either the bladed ring 26 or the central disk hub 28 about the axis of rotation 22. Typically, one of the bladed ring 26 or the central disk hub 28, usually the bladed ring 26, is held stationary, and the other, usually the central disk hub 28, is rotated about the axis of rotation 22. However, this may be reversed, or both the bladed ring 26 and the central disk hub 28 may be rotated about the axis of rotation 22, as long as there is still a sufficient relative rotational movement between the two components. During step 52, as depicted in FIG. 3, the central disk hub 28 and the bladed ring 26 are axially displaced from each other along the axis of rotation 22.

While the relative rotation of step 52 continues, the central disk hub 28 and the bladed ring 26 are moved together parallel to the axis of rotation 22 until an inner surface 62 of the ring 32 comes into contact with an outer surface 64 of the central disk hub 28, step 54. To facilitate this contact, the surfaces 62 and 64 are preferably not perpendicular to the radial direction 24 as initially provided, but do have about the same angle relative to the radial direction 24 and are therefore conformably shaped so that they slide into contact with each other. The surfaces 62 and 64 are touched to each other, generating frictional heating due to the continuing relative rotation of the bladed ring 26 and the central disk hub 28. The pressure in the direction parallel to the axis of rotation 22 is increased to bring the temperature of the portions of the bladed ring 26 and the central disk hub 28 that lie adjacent to the respective surfaces 62 and 64 to a temperature near to, but not reaching, the lower of the melting points of the bladed ring 26 and the central disk hub 28 (which is a single temperature in the event that the bladed ring 26 and the central disk hub 28 are made of the same material). The bladed ring 26 and the central disk hub 28 are held in contact with axial pressure under these conditions for a period of time sufficient to cause them to bond together along the surfaces 62 and 64, forming the solid state weld joint 34. As used herein, "solid state weld joint" means that both the bladed ring 26 and the central disk hub 28 do not melt during the welding step 50. After the solid-state inertia welding 50 is completed and the now-welded rotor assembly 20 cooled to room temperature, it may be post processed by any operable approach, step 56. Post-processing 56 typically includes final machining of the disk 36, application of coatings, precipitation heat treating, and the like. The final heat treatment is restricted to temperatures that do not affect the grain size in either the bore, the ring, or the blade.

Figure 4:
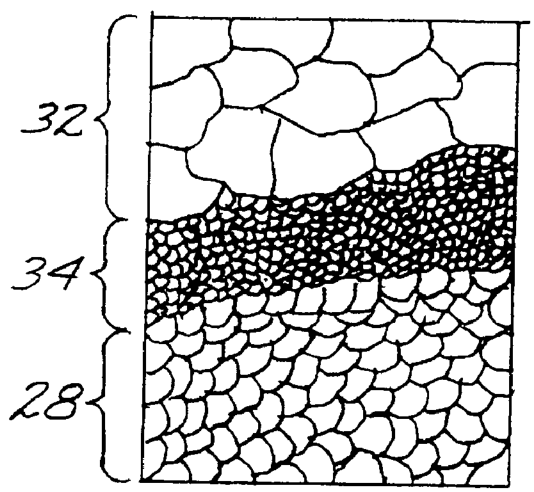
FIG. 4 is a schematic indication of the grain structure across the inertia welded joint.

FIG. 4 illustrates the type of grain structure resulting from the processing of FIG. 2. The ring 32 has a coarse grain size as a result of the bonding 46 and other heat treatment procedures. The central disk hub 28 has a fine grain size, because of its processing in step 48. (The turbine blades 30 also have a characteristic grain structure resulting from steps 44 and 46.) The solid-state inertia welding 50 does not significantly alter the grain sizes of the ring 32 and the central disk hub 28 (or of the turbine blades 30), because they remain at relatively low temperature, close to room temperature, throughout most of their volumes during the solid-state inertia welding 50.

The solid-state weld joint 34, which has a finite width although shown in FIG. 1 as a line, has a finer grain size than both of the ring 32 and the central disk hub 28. The fine-grain structure of the solid-state weld joint 34 results from the mechanical deformation during the solid-state inertia welding 50. Only the volume immediately adjacent to the surfaces 62 and 64 is affected in step 50. When the ring 32 and the central disk hub 28 become bonded, the relative rotation ceases and the heat input ends. The heat in the solid-state weld joint 34 is rapidly conducted into the respective adjacent portions of the ring 32 and the central disk hub 28, rapidly cooling the region along the solid-state weld joint 34 to produce a fine grain size. The fine grain size in the solid-state weld joint 34 gives it high strength. The radial location of the solid-state weld joint 34 is selected to be sufficiently far inwardly from the turbine blades 30 that creep is not a major concern, and the small grain size of the solid-state weld joint 34 does not adversely impact the creep properties of the disk 36. The final solid state weld joint may be perpendicular to the radial direction 24, or it may be angled at an acute angle in relation to the radial direction 24.

An important advantage of the present approach is that the ring 32 and the central disk hub 28, which together form the disk 36 upon which the turbine blades 30 are supported, may be produced with different properties. The grain size may be controlled in the manner just discussed. The compositions may be selected such that the ring 32 is made of a first material, and the turbine blades 30 are made of a second material. In one case, the ring 32 is made of a first nickel-base superalloy, and the turbine blades 30 are made of a second nickel-base superalloy. In another embodiment, the ring 32 and the central disk hub 28 are made of a first material, and the turbine blades 30 are made of a second material. For example, the ring 32 and the central disk hub 28 may be made of a first nickel-base superalloy, and the turbine blades 30 may be made of a second nickel-base superalloy. In yet another case, the ring 32 is made of a first material, the turbine blades 30 are made of a second material, and the central disk hub 28 is made of a third material. A further advantage is the ability to use a high temperature for the blade bonding step 46 to provide a high-quality joint between the turbine blades 30 and the ring 32. Otherwise, the blade-bonding temperature would be restricted by the grain-growth limiting feature, typically the gamma-prime solvus temperature of the disk.

The rotor assembly 20 is most preferably made of two or more nickel-base superalloys. As used herein, "nickel-base" means that the composition has more nickel present than any other element. The nickel-base superalloys are typically of a composition that is strengthened by the precipitation of gamma-prime phase or a related phase such as gamma-double-prime. Examples of alloys that may be used in the disk 36 include: for the turbine blades 30, directionally solidified or single-crystal Rene™ N5, having a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and minor elements; for the ring 32 and the central disk hub 28, Rene™ 104, having a nominal composition, in weight percent, of about 20.6 percent cobalt, about 13.0 percent chromium, about 3.4 percent aluminum, about 3.70 percent titanium, about 2.4 percent tantalum, about 0.90 percent niobium, about 2.10 percent tungsten, about 3.80 percent molybdenum, about 0.05 percent carbon, about 0.025 percent boron, about 0.05 percent zirconium, up to about 0.5 percent iron, balance nickel and minor impurity elements, or Alloy 718, having a nominal composition, in weight percent, of from about 50 to about 55 percent nickel, from about 17 to about 21 percent chromium, from about 4.75 to about 5.50 percent columbium plus tantalum, from about 2.8 to about 3.3 percent molybdenum, from about 0.65 to about 1.15 percent titanium, from about 0.20 to about 0.80 percent aluminum, 1.0 percent maximum cobalt, and balance iron totaling 100 percent by weight.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An axial-flow turbine rotor assembly, comprising:

a bladded ring including a ring, and a plurality of turbine blades affixed to the ring and extending radially outwardly from the ring;

a central disk hub; and a solid state weld joint between the central disk hub and the ring of the bladed ring.

2. The rotor assembly of claim 1, wherein the ring is made of a first material, and the turbine blades are made of a second material.

3. The rotor assembly of claim 1, wherein the ring is made of a first nickel-base superalloy, and the turbine blades are made of a second nickel-base superalloy.

4. The rotor assembly of claim 1, wherein the ring and the central disk hub are made of a first material, and the turbine blades are made of a second material.

5. The rotor assembly of claim 1, wherein the ring and the central disk hub are made of a first nickel-base superalloy, and the turbine blades are made of a second nickel-base superalloy.

6. The rotor assembly of claim 1, wherein the ring is made of a first material, the turbine blades are made of a second material, and the central disk hub is made of a third material.

7. The rotor assembly of claim 1, wherein the ring has a first grain size, the central disk hub has a second grain size smaller than the first grain size, and the solid state weld joint has a third grain size smaller than the second grain size.

8. The rotor assembly of claim 1, wherein the turbine blades are bonded to the ring.

9. The rotor assembly of claim 1, wherein the turbine blades are mechanically affixed to the ring but not bonded to the ring.

10. The rotor assembly of claim 1, wherein the weld joint is a solid state inertia weld joint.

11. An axial-flow turbine rotor assembly, comprising:

a bladed ring including a ring made of a first nickel-base superalloy, and a plurality of turbine blades bonded to the ring and extending radially outwardly from the ring, wherein the turbine blades are made of a second nickel-base superalloy, a central disk hub made of the first nickel-base superalloy; and a solid state weld joint between the central disk hub and the ring of the bladed ring.

12. The rotor assembly of claim 11, wherein the ring has a first grain size, the central disk hub has a second grain size smaller than the first grain size, and the solid state weld joint has a third grain size smaller than the second grain size.

* * * * *